US012491710B2

(12) United States Patent
Yoshida

(10) Patent No.: US 12,491,710 B2
(45) Date of Patent: Dec. 9, 2025

(54) DRIVE BOARD, LIQUID JET HEAD, AND LIQUID JET RECORDING DEVICE

(71) Applicant: SII Printek Inc., Chiba (JP)

(72) Inventor: Kensuke Yoshida, Chiba (JP)

(73) Assignee: SII PRINTEK INC., Chiba (JP)

(*) Notice: Subject to any disclaimer, the term of this patent is extended or adjusted under 35 U.S.C. 154(b) by 141 days.

(21) Appl. No.: 18/387,590

(22) Filed: Nov. 7, 2023

(65) Prior Publication Data

US 2024/0173966 A1 May 30, 2024

(30) Foreign Application Priority Data

Nov. 29, 2022 (JP) ................................ 2022-190195

(51) Int. Cl.
*B41J 2/045* (2006.01)
*B41J 2/14* (2006.01)

(52) U.S. Cl.
CPC ........ *B41J 2/04541* (2013.01); *B41J 2/14201* (2013.01); *B41J 2002/14491* (2013.01)

(58) Field of Classification Search
CPC ................ B41J 2002/14491; B41J 2/01; B41J 2/04541; B41J 2/14201; B41J 2/04581
USPC .............................. 347/9, 10, 50, 54, 68, 71
See application file for complete search history.

(56) References Cited

U.S. PATENT DOCUMENTS

2016/0152025 A1 6/2016 Kida
2017/0239940 A1 8/2017 Yamashita
2019/0255840 A1* 8/2019 Nitta .................... B41J 2/14201
2019/0283420 A1 9/2019 Kida

FOREIGN PATENT DOCUMENTS

EP 3528601 A1 8/2019
JP 2017-144672 A 8/2017

OTHER PUBLICATIONS

Extended European Search Report in Europe Application No. 23212687.0, dated Apr. 11, 2024, 7 pages.

* cited by examiner

*Primary Examiner* — Jannelle M Lebron
(74) *Attorney, Agent, or Firm* — Crowell & Moring LLP

(57) ABSTRACT

The drive board according to an embodiment of the present disclosure is a board configured to output a drive signal to be applied to a liquid jet head having a plurality of nozzles, including at least one drive device which is mounted on a board surface of the drive board, which is configured to generate the drive signal for jetting liquid from the nozzles, and which has a plurality of digital ground terminals located at a plurality of places different from each other, and a digital ground wiring line which is arranged in a mounting region of the drive device, and which is electrically coupled commonly to the digital ground terminals at two or more places out of the digital ground terminals at the plurality of places.

7 Claims, 13 Drawing Sheets

COMPARATIVE EXAMPLE

MODIFIED EXAMPLE 2-2

DRIVE BOARD, LIQUID JET HEAD, AND LIQUID JET RECORDING DEVICE

RELATED APPLICATIONS

This application claims priority to Japanese Patent application No. JP2022-190195 filed on Nov. 29, 2022, the entire content of which is incorporated herein by reference.

BACKGROUND OF THE INVENTION

1. Field of the Invention

The present disclosure relates to a drive board, a liquid jet head, and a liquid jet recording device.

2. Description of the Related Art

Liquid jet recording devices equipped with liquid jet heads are used in a variety of fields, and a variety of types of liquid jet heads have been developed (see, e.g., JP2017-144672A).

In such a liquid jet head, in general, it is required to improve the reliability.

It is desirable to provide a drive board, a liquid jet head, and a liquid jet recording device capable of improving the reliability.

SUMMARY OF THE INVENTION

The drive board according to an embodiment of the present disclosure is a board configured to output a drive signal to be applied to a liquid jet head having a plurality of nozzles, including at least one drive device which is mounted on a board surface of the drive board, which is configured to generate the drive signal for jetting liquid from the nozzles, and which has a plurality of digital ground terminals located at a plurality of places different from each other, and a digital ground wiring line which is arranged in a mounting region of the drive device, and which is electrically coupled commonly to the digital ground terminals at two or more places out of the digital ground terminals at the plurality of places.

A liquid jet head according to an embodiment of the present disclosure includes the drive board according to the embodiment of the present disclosure, and a jet section which is configured to jet the liquid based on the drive signal output from the drive board, and which has a plurality of nozzles.

A liquid jet recording device according to an embodiment of the present disclosure includes the liquid jet head according to the embodiment of the present disclosure.

According to the drive board, the liquid jet head, and the liquid jet recording device related to an embodiment of the disclosure, it becomes possible to improve the reliability.

BRIEF DESCRIPT

DETAILED DESCRIPTION OF THE PREFERRED EMBODIMENTS

An embodiment of the present disclosure will hereinafter be described in detail with reference to the drawings. It should be noted that the description will be presented in the following order:

1. Embodiment (an example of a drive board provided with a digital ground wiring line electrically coupled in common to digital ground terminals at two or more places)
2. Modified Examples
   - Modified Examples 1-1 through 1-3 (examples of a digital ground wiring line having a first guard region)
   - Modified Examples 2-1, 2-2 (examples of a digital ground wiring line further having a second guard region)
3. Other Modified Examples

1. Embodiment

[Outline Configuration of Printer 5]

Figure 1:
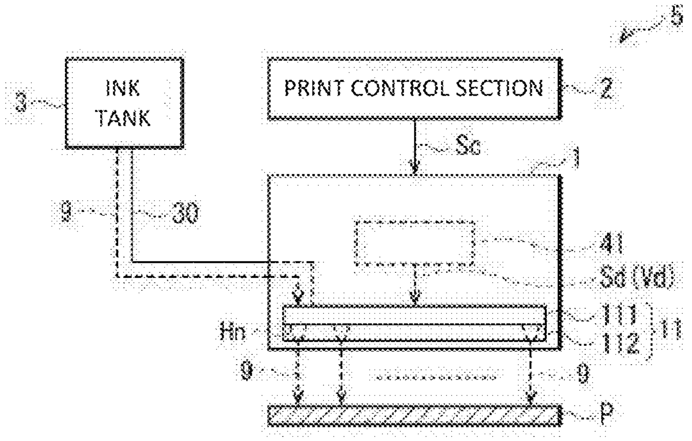
FIG. 1 is a block diagram showing an outline configuration example of a liquid jet device according to an embodiment of the present disclosure.
Figure 2:
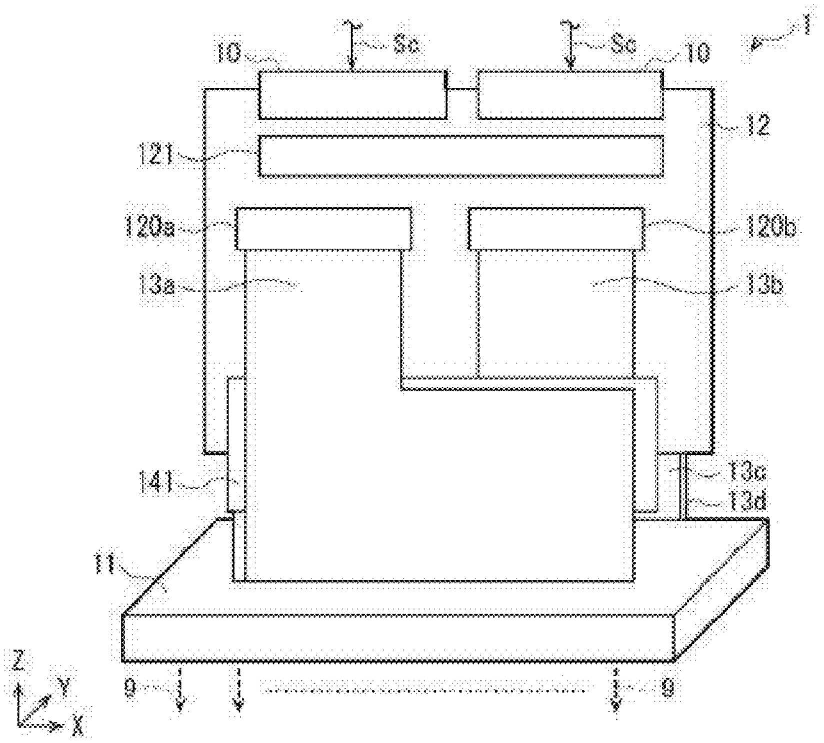
FIG. 2 is a perspective view schematically showing an outline configuration example of a liquid jet head shown in FIG. 1.
Figure 3:
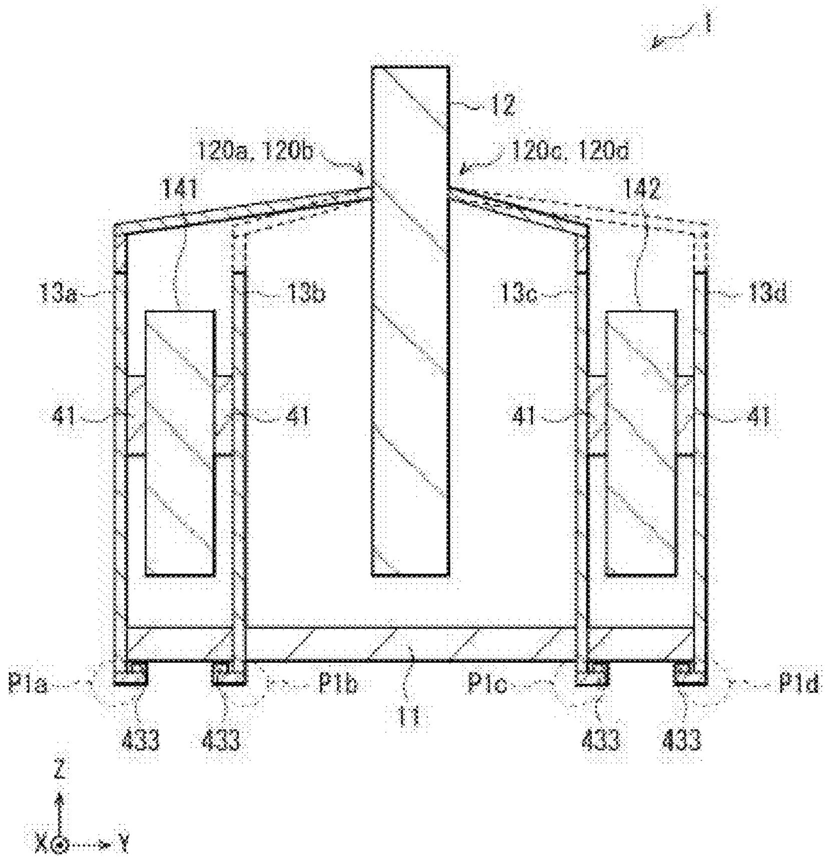
FIG. 3 is a cross-sectional view schematically showing a configuration example of the liquid jet head shown in FIG. 2.

FIG. 1 is a block diagram showing an outline configuration example of a printer 5 as a liquid jet recording device according to an embodiment of the present disclosure. FIG. 2 is a perspective view schematically showing an outline configuration example of an inkjet head 1 as a liquid jet head shown in FIG. 1. FIG. 3 is a cross-sectional view (a Y-Z cross-sectional view) schematically showing a configuration example of the inkjet head 1 shown in FIG. 2. It should be noted that a scale size of each of the members is accordingly altered so that the member is shown in a recognizable size in the drawings used in the description of the present specification.

The printer 5 is an inkjet printer for performing recording (printing) of images, characters, and the like on a recording target medium (e.g., recording paper P shown in FIG. 1) using ink 9 described later. As shown in FIG. 1, the printer 5 is provided with the inkjet head 1, a print control section 2, and an ink tank 3.

It should be noted that the inkjet head 1 corresponds to a specific example of a "liquid jet head" in the present disclosure, and the printer 5 corresponds to a specific example of a "liquid jet recording device" in the present disclosure. Further, the ink 9 corresponds to a specific example of a "liquid" in the present disclosure.

(A. Print Control Section 2)

The print control section 2 is for supplying the inkjet head 1 with a variety of types of information (data). Specifically, as shown in FIG. 1, the print control section 2 is arranged to supply each of constituents (drive devices 41 described later and so on) in the inkjet head 1 with a print control signal Sc. It should be noted that the print control signal Sc is arranged to include, for example, image data, an ejection timing signal, and a power-supply voltage for making the inkjet head 1 operate.

(B. Ink Tank 3)

The ink tank 3 is a tank for containing the ink 9 inside. As shown in FIG. 1, the ink 9 in the ink tank 3 is arranged to be supplied to the inside (a jet section 11 described later) of the inkjet head 1 via an ink supply tube 30. It should be noted that such an ink supply tube 30 is formed of, for example, a flexible hose having flexibility.

(C. Inkjet Head 1)

The inkjet head 1 is a head for jetting (ejecting) the ink 9 shaped like a droplet from a plurality of nozzle holes Hn described later to the recording paper P as represented by dotted arrows in FIG. 1 to thereby perform recording of images, characters, and so on. As shown in, for example, FIG. 2 and FIG. 3, the inkjet head 1 is provided with the single jet section 11, a single I/F (interface) board 12, four flexible boards 13*a*, 13*b*, 13*c*, and 13*d*, and two cooling units 141, 142.

(C-1. I/F Board 12)

As shown in FIG. 2 and FIG. 3, the I/F board 12 is provided with two connectors 10, four connectors 120*a*, 120*b*, 120*c*, and 120*d*, and a circuit arrangement region 121.

As shown in FIG. 2, the connectors 10 are each a part (a connector part) for inputting the print control signal Sc which is described above, and which is supplied from the print control section 2 toward the inkjet head 1 (the flexible boards 13*a*, 13*b*, 13*c*, and 13*d* described later). The connectors 120*a*, 120*b*, 120*c*, and 120*d* are parts (connector parts) for electrically coupling the I/F board 12 and the flexible boards 13*a*, 13*b*, 13*c*, and 13*d*, respectively.

The circuit arrangement region 121 is a region where a variety of circuits are arranged on the I/F board 12. It should be noted that it is also possible to arrange that such a circuit arrangement region is also disposed in other regions on the I/F board 12.

(C-2. Jet Section 11)

As shown in FIG. 1, the jet section 11 is a part which has the plurality of nozzle holes Hn, and which jets the ink 9 from these nozzle holes Hn. Such jet of the ink 9 is arranged to be performed in accordance with drive signals Sd (drive voltages Vd) supplied from the drive devices 41 described later on each of the flexible boards 13*a*, 13*b*, 13*c*, and 13*d* (see FIG. 1).

As shown in FIG. 1, such a jet section 11 is configured including an actuator plate 111 and a nozzle plate 112.

(Nozzle Plate 112)

The nozzle plate 112 is a plate formed of a film material such as polyimide, or a metal material, and has the plurality of nozzle holes Hn described above as shown in FIG. 1. These nozzle holes Hn are formed side by side at predetermined intervals, and each have, for example, a circular shape.

Specifically, in the example of the jet section 11 shown in FIG. 2, the jet section 11 is constituted by a plurality of nozzle arrays (four nozzle arrays) each of which has the plurality of nozzle holes Hn in the nozzle plate 112 arranged along an array direction (an X-axis direction). Further, these four nozzle arrays are arranged side by side along a direction (a Y-axis direction) perpendicular to the array direction.

It should be noted that such a nozzle hole Hn corresponds to a specific example of a "nozzle" in the present disclosure.

(Actuator Plate 111)

The actuator plate 111 is a plate formed of a piezoelectric material such as PZT (lead zirconate titanate). The actuator plate 111 is provided with a plurality of channels (pressure chambers). These channels are each a part for applying pressure to the ink 9, and are arranged side by side so as to be parallel to each other at predetermined intervals. Each of the channels is partitioned with drive walls (not shown) formed of a piezoelectric body, and forms a groove part having a recessed shape in a cross-sectional view.

As such channels, there exist ejection channels for ejecting the ink 9, and dummy channels (non-ejection channels) which do not eject the ink 9. In other words, it is arranged that the ejection channels are filled with the ink 9 on the one hand, but the dummy channels are not filled with the ink 9 on the other hand. It should be noted that it is arranged that filling of each of the ejection channels with the ink 9 is performed via, for example, a flow channel (a common flow channel) commonly communicated with such ejection channels. Further, it is arranged that each of the ejection channels is individually communicated with the nozzle hole Hn in the nozzle plate 112 on the one hand, but each of the dummy channels is not communicated with the nozzle hole Hn on the other hand. These ejection channels and the dummy channels are alternately arranged side by side along the array direction (the X-axis direction) described above.

Further, on the inner side surfaces opposed to each other in the drive walls described above, there are respectively disposed drive electrodes. As the drive electrodes, there exist common electrodes disposed on the inner side surfaces facing the ejection channels, and active electrodes (individual electrodes) disposed on the inner side surfaces facing the dummy channels. These drive electrodes and the drive devices 41 described later are electrically coupled to each other via each of the flexible boards 13*a*, 13*b*, 13*c*, and 13*d*. Thus, it is arranged that the drive voltages Vd (the drive signals Sd) described above are applied to the drive electrodes from the drive devices 41 via each of the flexible boards 13*a*, 13*b*, 13*c*, and 13*d* (see FIG. 1).

(C-3. Flexible Boards 13*a*, 13*b*, 13*c*, and 13*d*)

The flexible boards 13*a*, 13*b*, 13*c*, and 13*d* are each a board for electrically coupling the I/F board 12 and the jet section 11 to each other as shown in FIG. 2 and FIG. 3. These flexible boards 13*a*, 13*b*, 13*c*, and 13*d* are arranged to individually control the jet actions of the ink 9 in the four nozzle arrays in the nozzle plate 112 described above, respectively. Further, as indicated by the reference symbols P1*a*, P1*b*, P1*c*, and P1*d* in, for example, FIG. 3, it is arranged that the flexible boards 13*a*, 13*b*, 13*c*, and 13*d* are folded around places (around pressure-bonding electrodes 433) where the flexible boards 13*a*, 13*b*, 13*c*, and 13*d* are coupled to the jet section 11, respectively. It should be noted that it is arranged that electrical coupling between the pressure-bonding electrodes 433 and the jet section 11 is achieved by, for example, thermocompression bonding using an ACF (Anisotropic Conductive Film).

On each of such flexible boards 13*a*, 13*b*, 13*c*, and 13*d*, there are individually mounted the drive devices 41 (see FIG. 3). These drive devices 41 are each a device for outputting the drive signals Sd (the drive voltages Vd) for jetting the ink 9 from the nozzle holes Hn in the corresponding nozzle array in the jet section 11. Therefore, such drive signals Sd are arranged to be output from each of the flexible boards 13*a*, 13*b*, 13*c*, and 13*d* to the jet section 11. It should be noted that such drive devices 41 are each formed of, for example, an ASIC (Application Specific Integrated Circuit).

Further, these drive devices 41 are arranged to be cooled by the cooling units 141, 142 described above. Specifically, as shown in FIG. 3, the cooling unit 141 is fixedly arranged between the drive devices 41 on the flexible boards 13*a*, 13*b*, and by pressing the cooling unit 141 against each of these drive devices 41, the drive devices 41 are cooled. Similarly, the cooling unit 142 is fixedly arranged between the drive devices 41 on the flexible boards 13*c*, 13*d*, and by pressing the cooling unit 142 against each of these drive devices 41, the drive devices 41 are cooled. It should be noted that such cooling units 141, 142 can each be configured using a variety of types of cooling mechanisms.

[Detailed Configuration of Flexible Boards 13*a*, 13*b*, 13*c*, and 13*d*]

Then, a detailed configuration example of the flexible boards 13*a*, 13*b*, 13*c*, and 13*d* described above will be described with reference to FIG. 4A, FIG. 4B, and FIG. 5 through FIG. 8 in addition to FIG. 1 through FIG. 3.

Figure 4A:
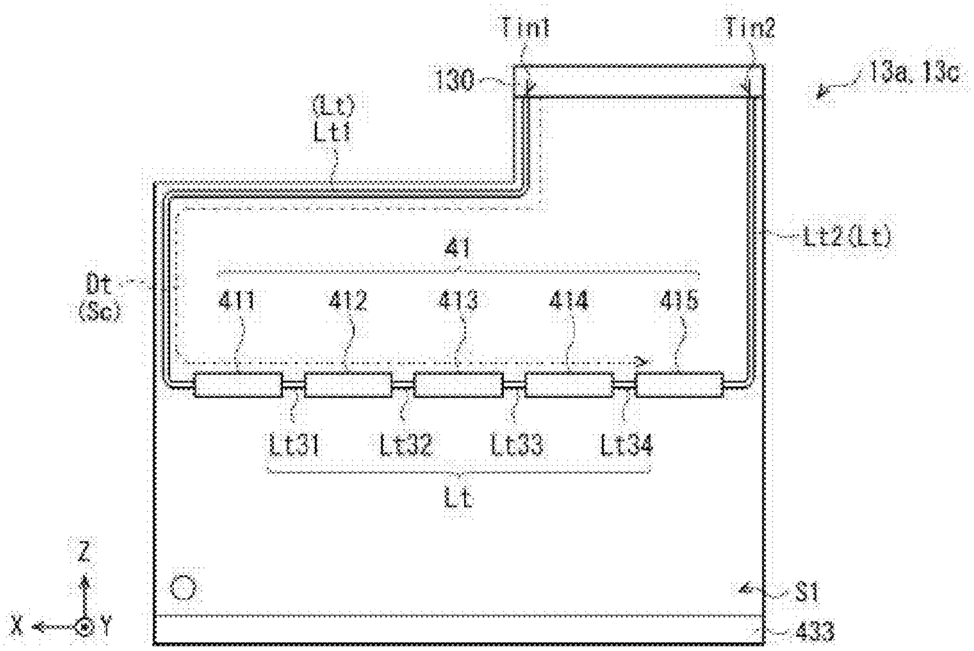
FIG. 4A is a plan view schematically showing a detailed configuration example of flexible boards shown in FIG. 2 and FIG. 3.
Figure 4B:
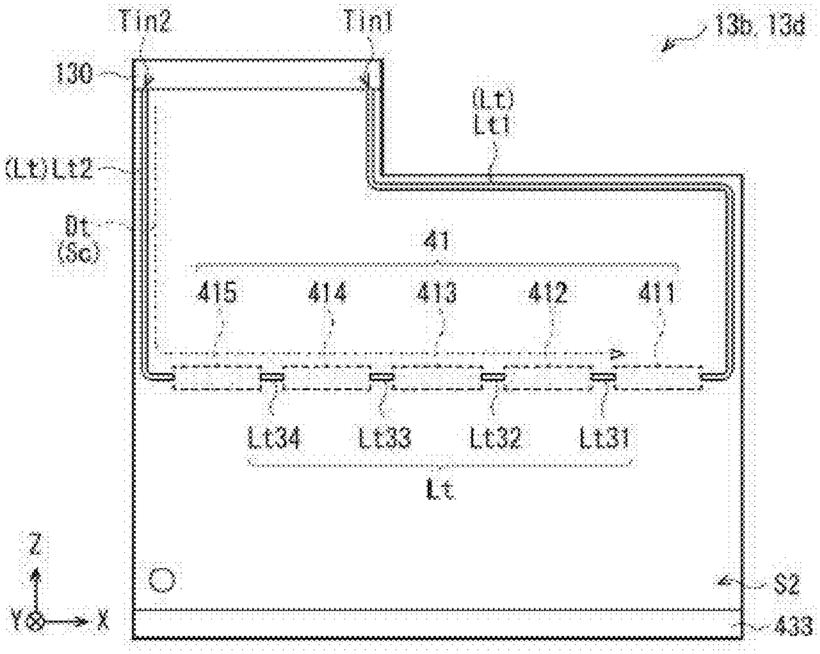
FIG. 4B is a plan view schematically showing a detailed configuration example of other flexible boards shown in FIG. 2 and FIG. 3.
Figure 5:
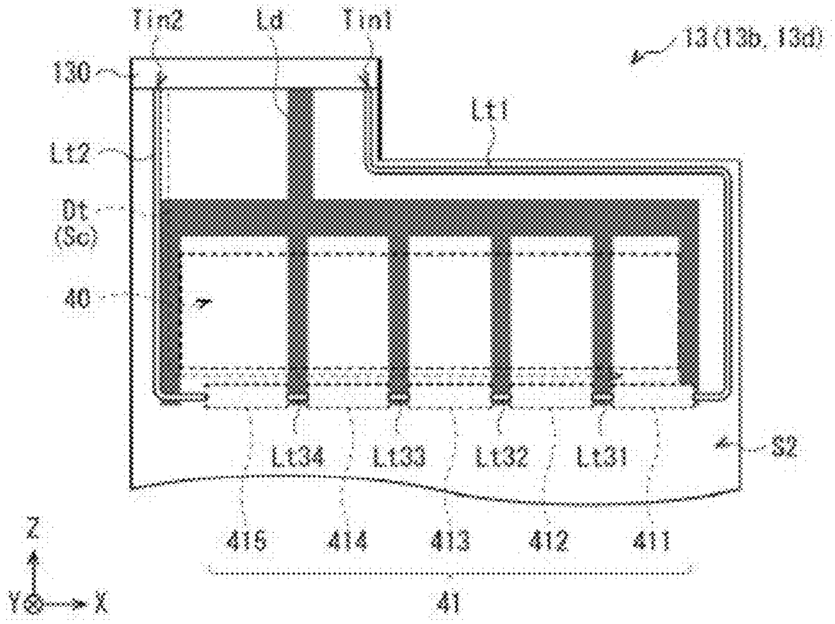
FIG. 5 is a plan view schematically showing an arrangement configuration example of wiring lines and so on in the flexible boards shown in FIG. 4B.
Figure 6:
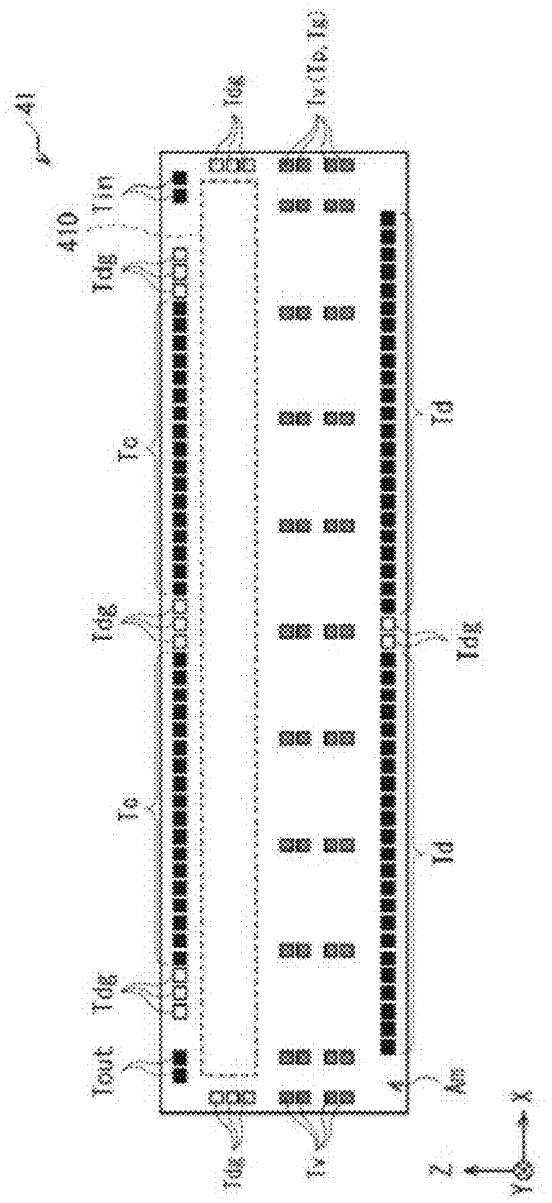
FIG. 6 is a plan view schematically showing a detailed configuration example of a drive device according to the embodiment.
Figure 7:
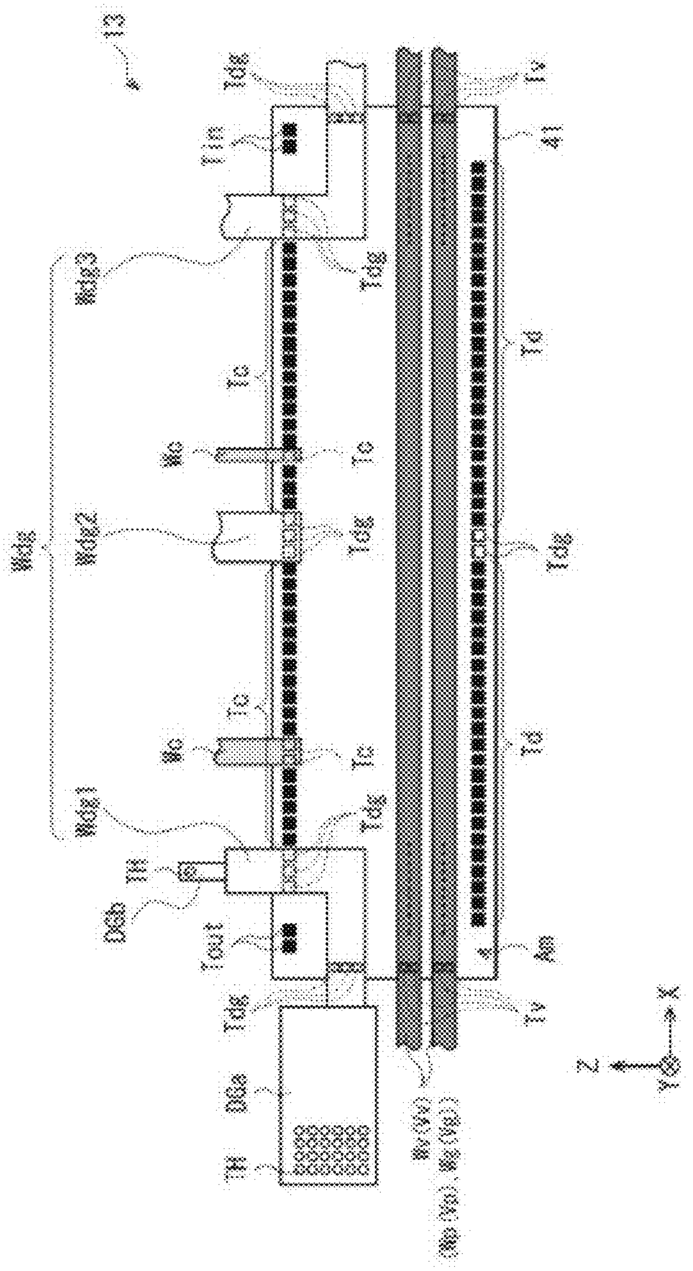
FIG. 7 is a plan view schematically showing a detailed configuration example of the flexible board according to the embodiment.
Figure 8:
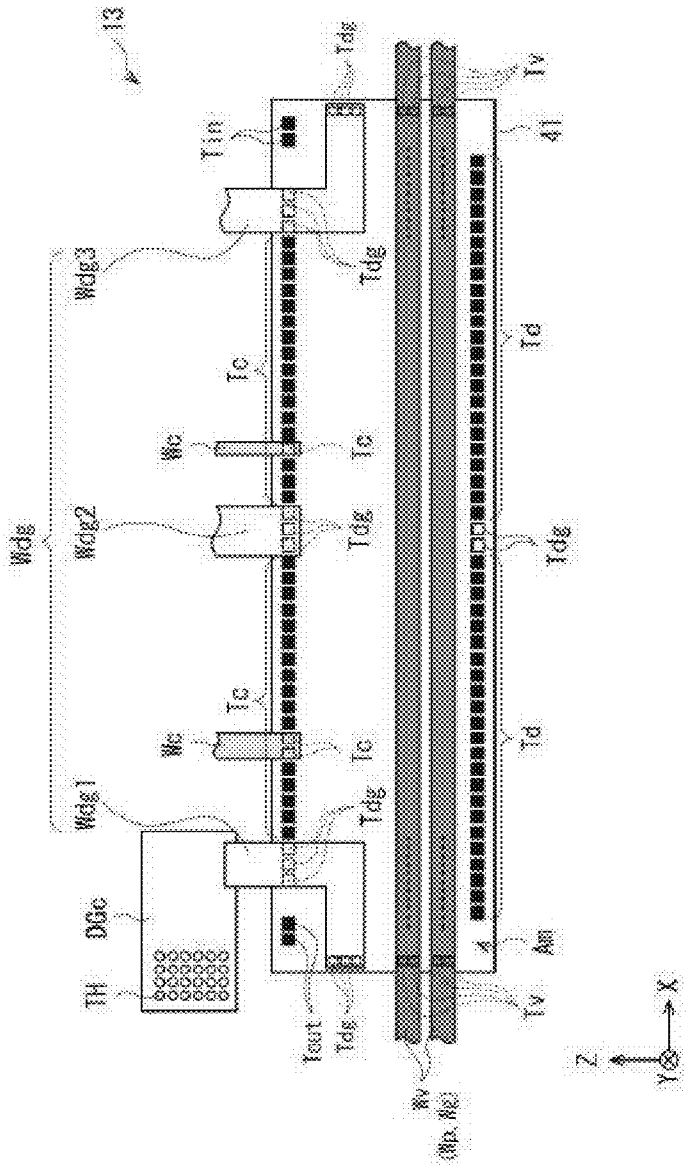
FIG. 8 is a plan view schematically showing another detailed configuration example of the flexible board according to the embodiment.

FIG. 4A and FIG. 4B are plan views (Z-X plane views) schematically showing a detailed configuration example of the flexible boards 13*a* through 13*d* shown in FIG. 2 and FIG. 3. Specifically, FIG. 4A shows a planar configuration example (a Z-X planar configuration example) of the flexible boards 13*a*, 13*c*, and FIG. 4B shows a planar configuration example (a Z-X planar configuration example) of the flexible boards 13*b*, 13*d*. Further, FIG. 5 is a plan view (a Z-X plane view) schematically showing an arrangement configuration example of wiring lines and so on in the flexible boards 13*b*, 13*d* shown in FIG. 4B. FIG. 6 is a plan view (a Z-X plane view) schematically showing a detailed configuration example of the drive device 41 according to the present embodiment (a configuration example when viewed from a reverse surface S2 side described later). FIG. 7 and FIG. 8 are each a plan view (a Z-X plane view) schematically showing a detailed configuration example of the flexible boards 13 (13*a* through 13*d*) according to the present embodiment (a configuration example when viewed from the reverse surface S2 side described later).

It should be noted that in FIG. 5, the flexible boards 13*b*, 13*d* are each shown with a collective reference of the flexible board 13. Further, in FIG. 5 described above, there is shown a configuration example of the case of the flexible boards 13*b*, 13*d*, but basically the same configuration is adopted in the case of the flexible boards 13*a*, 13*c* described above. Therefore, in each of FIG. 7 and FIG. 8, the flexible boards 13*a* through 13*d* are each represented by the flexible board 13 as a collective reference of the flexible boards 13*a* through 13*d*, and are each hereinafter described arbitrarily as the flexible board 13. Further, in FIG. 4A and FIG. 4B, differential lines Lt1, Lt2, and Lt31 through Lt34 described later are each shown with a collective reference of differential lines Lt, and are each hereinafter described arbitrarily as the differential lines Lt.

Here, the flexible boards 13 (13*a* through 13*d*) described above each correspond to a specific example of a "drive board" in the present disclosure.

First, as shown in each of FIG. 4A, FIG. 4B, and FIG. 5, the following members are provided to each of these flexible boards 13*a* through 13*d*. That is, there are provided coupling electrodes 130, first input terminals Tin1, second input terminals Tin2, the differential lines Lt1, Lt2, and Lt31 through Lt34, the plurality of (five in this example) drive devices 41, and the pressure-bonding electrodes 433 described above.

The coupling electrodes 130 are disposed in an end portion region at the I/F board 12 side in each of the flexible boards 13*a* through 13*d*, and are electrodes for electrically coupling each of the flexible boards 13*a* through 13*d* and the I/F board 12 to each other.

It is arranged that transmission data Dt (the print control signal Sc described above) transmitted from the outside (the print control section 2 described above) of the inkjet head 1 is input to each of the first input terminals Tin1 and the second input terminals Tin2 (see FIG. 1, FIG. 2, FIG. 4A, FIG. 4B, and FIG. 5). Further, it is arranged that such transmission data Dt is transmitted to the inside of each of the flexible boards 13*a* through 13*d* via one of the first input terminals Tin1 and the second input terminals Tin2. Specifically, as shown in, for example, FIG. 4A, it is arranged that in each of the flexible boards 13*a*, 13*c*, the transmission data Dt is transmitted to the inside of each of the flexible boards 13*a*, 13*c* via the first input terminals Tin1. Meanwhile, as shown in, for example, FIG. 4B and FIG. 5, it is arranged that in each of the flexible boards 13*b*, 13*d*, the transmission data Dt is transmitted to the inside of each of the flexible boards 13*b*, 13*d* via the second input terminals Tin2.

The five drive devices 41 described above are mounted on each of the flexible boards 13*a* through 13*d* (at an obverse surface S1 side out of the obverse surface S1 and the reverse surface S2) in the example shown in FIG. 4A, FIG. 4B, and FIG. 5. As such five drive devices 41 as described above, there are disposed the drive devices 411 through 415, respectively, in the example shown in FIG. 4A, FIG. 4B, and FIG. 5. Further, these five drive devices 41 are arranged in series (cascaded) to each other on the obverse surface S1 described above between the first input terminals Tin1 and the second input terminals Tin2 via a plurality of differential lines described later. Specifically, as shown in FIG. 4A, FIG. 4B, and FIG. 5, the drive devices 411 through 415 are arranged in series in this order from the first input terminals Tin1 side toward the second input terminals Tin2 in all of the flexible boards 13*a* through 13*d*. In other words, the drive device 411 is located at one end of the serial arrangement of such drive devices 41, and at the same time, the drive device 415 is located at the other end of this serial arrangement. Further, the plurality of (three in this example) drive devices 412 through 414 is located between these drive devices 411, 415. Each of these five drive devices 41 is arranged to generate the drive signals Sd described above based on the transmission data Dt input via one of the first input terminals Tin1 and the second input terminals Tin2 as described above. It should be noted that the drive signals Sd generated in such a manner are arranged to be supplied to the jet section 11 side respectively via the pressure-bonding electrodes 433 described above on each of the flexible boards 13*a* through 13*d*.

Further, a plurality of transmission lines (differential lines) for transmitting the transmission data Dt via the five drive devices 41 arranged in series to each other is arranged between the first input terminals Tin1 and the second input terminals Tin2. In other words, the differential lines are lines for transmitting the transmission data Dt as differential signals toward each of the drive devices 41. Specifically, as shown in FIG. 4A, FIG. 4B, and FIG. 5, the differential lines Lt1 is arranged between the first input terminals Tin1 and the drive device 411, and the differential lines Lt2 is arranged between the second input terminals Tin2 and the drive device 415. Further, the differential lines Lt31 is arranged between the drive devices 411, 412, and the differential lines Lt32 is arranged between the drive devices 412, 413. The differential lines Lt33 is arranged between the drive devices 413, 414, and the differential lines Lt34 is arranged between the drive devices 414, 415.

Here, as described above, the input terminal (the first input terminals Tin1 or the second input terminals Tin2) to which the transmission data Dt is input is different (see FIG. 4A, FIG. 4B, and FIG. 5) between the flexible boards 13*a*, 13*c* and the flexible boards 13*b*, 13*d*. Further, in accordance therewith, the transmission direction inside the board of the transmission data Dt having been input is different between the flexible boards 13*a*, 13*c* and the flexible boards 13*b*, 13*d*. Specifically, it is arranged that the transmission data Dt having been input from the first input terminals Tin1 is transmitted in the order of the drive devices 411 through 415 (see FIG. 4A) in each of the flexible boards 13*a*, 13*c*. In contrast, it is arranged that the transmission data Dt having been input from the second input terminals Tin2 is transmitted in the order of the drive devices 415 through 411 (see FIG. 4B and FIG. 5) in each of the flexible boards 13*b*, 13*d*.

In such a manner, the input terminal to which the transmission data Dt is input and an output terminal from which the transmission data Dt is output are different between the flexible boards 13*a*, 13*c* and the flexible boards 13*b*, 13*d*. It should be noted that the flexible boards 13*a*, 13*c* and the flexible boards 13*b*, 13*d* are made the same in the structure of the board itself as each other, and the configurations of the flexible boards 13*a* through 13*d* are commonalized (shared) (see FIG. 4A, FIG. 4B, and FIG. 5). In other words, there is no need to prepare a plurality of types of flexible boards (drive boards) in accordance with the transmission direction of the transmission data Dt and so on, and it results in that there is disposed only a single type of flexible board 13 (drive board) in the inkjet head 1.

Further, as shown in FIG. 5, on the flexible board 13, there is arranged a driving constant-potential line Ld for supplying a predetermined constant-potential for driving to the drive devices 41 (the drive devices 411 through 415). As the driving constant-potential line Ld, there are disposed (see FIG. 7 and FIG. 8) constant-potential wiring lines Wv for supplying predetermined constant potentials Vv although the details will be described later. Further, the constant-potential wiring lines Wv include a power-supply wiring line Wp for supplying a power-supply potential Vp as the constant potential Vv, and a ground wiring line Wg for supplying a ground potential Vg as the constant potential Vv (see FIG. 7 and FIG. 8). Further, on each of the flexible boards 13 (the reverse surfaces S2), there is disposed a component arrangement region 40 in which a variety of components other than the drive devices 41 are arranged.

It should be noted that the flexible boards 13 are each formed as a double-sided board with a double-layered structure having the obverse surface S1 and the reverse surface S2 described above. Specifically, the flexible boards 13 each have a first wiring layer at the obverse surface S1 side and a second wiring layer at the reverse surface S2 side opposed to each other along a direction (the Y-axis direction) perpendicular to a board surface (a Z-X plane) as wiring layers of such a double-layered structure.

(Drive Devices 41 and Various Wiring Lines)

The drive devices 41 (the drive devices 411 through 415) described above are mounted at the obverse surface S1 side (on the first wiring layer described above) in each of the flexible boards 13. Specifically, in the present embodiment, each of the drive devices 41 is mounted using flip-chip mounting on the board surface (the obverse surface S1) of the flexible board 13 via a variety of terminals (bumps) described later. It should be noted that in FIG. 6 through FIG. 8, there is shown a mounting target region Am (a mounting region of the drive device 41 on the flexible board 13) to the board surface in the drive device 41.

In the example shown in FIG. 6 through FIG. 8, such a drive device 41 has a digital circuit arrangement region 410, two data input terminals Tin, two data output terminals Tout, a plurality of device control terminals Tc, a plurality of drive terminals Td, a plurality of constant-potential terminals Tv, and a plurality of digital ground terminals Tdg. It should be noted that the "digital ground" means the ground with respect to a digital signal, and the same applies to the following.

As shown in FIG. 6, the digital circuit arrangement region 410 extends along the longitudinal direction (the X-axis direction) of the drive device 41 in a region between the plurality of device control terminals Tc described later and the plurality of constant-potential terminals Tv in the mounting target region Am described above. In this digital circuit arrangement region 410, there are arranged a variety of digital circuits (a digital circuit for generating the drive signals Sd and so on) in the drive device 41.

It is arranged that the differential lines Lt described above as data wiring lines are respectively coupled to the data input terminals Tin and the data output terminals Tout, and it is arranged that the transmission data Dt is transmitted via the differential lines Lt. Specifically, it is arranged that the transmission data Dt is input to the data input terminals Tin via the differential lines Lt, and the transmission data Dt is output from the data output terminals Tout via the differential lines Lt. In the example shown in FIG. 6 through FIG. 8, these data input terminals Tin and these data output terminals Tout are arranged around the both ends along the longitudinal direction (the X-axis direction) of the drive device 41 at the input side (a positive direction side along the Z axis) of the drive device 41.

Here, the transmission data Dt (a variety of types of data included in the print control signal Sc) described above corresponds to a specific example of "data" in the present disclosure. Further, the differential lines Lt (Lt1, Lt2, Lt31 through Lt34) correspond to a specific example of a "data wiring line" and a "differential-transmission wiring line" in the present disclosure.

The device control terminals Tc are terminals for electrically coupling device control wiring lines We (wiring lines for performing a variety of types of control on the drive devices 41; see FIG. 7 and FIG. 8) on the flexible board 13 to each of the drive devices 41. In other words, the device control wiring lines We are individually coupled to such device control terminals Tc. In the example shown in FIG.

6 through FIG. 8, the plurality of device control terminals Tc is arranged side by side along the longitudinal direction of the drive device 41 at the input side (a region between the data input terminals Tin and the data output terminals Tout) of the drive device 41. Further, in the example shown in FIG. 6 through FIG. 8, these device control terminals Tc are divided (grouped) into two device control terminal groups arranged along the longitudinal direction of the drive device 41.

The drive terminals Td are terminals for electrically coupling the wiring lines (drive signal wiring lines) for individually transmitting the drive signals Sd, to the drive device 41. In other words, the drive signal wiring lines are electrically coupled individually to such drive terminals Td. In the example shown in FIG. 6 through FIG. 8, the plurality of (e.g., 128) drive terminals Td is arranged side by side along the longitudinal direction of the drive device 41 at the output side (a negative direction side along the Z axis) of the drive device 41. Further, in the example shown in FIG. 6 through FIG. 8, these drive terminals Td are divided (grouped) into two drive terminal groups arranged along the longitudinal direction of the drive device 41. It should be noted that as an example, these two drive terminal groups are each configured including 64 drive terminals Td.

The constant-potential terminals Tv are each a terminal for electrically coupling the constant-potential wiring line Wv (see FIG. 7 and FIG. 8) for supplying the predetermined constant potential Vv (the power-supply potential Vp or the ground potential Vg) described above, to the drive device 41. In the example shown in FIG. 6, the constant-potential terminals Tv have the plurality of power-supply terminals Tp and the plurality of ground terminals Tg. Further, in the example shown in FIG. 6, as described above, the constant-potential wiring lines Wv include the power-supply wiring line Wp for supplying the power-supply potential Vp, and the ground wiring line Wg for supplying the ground potential Vg.

In the example shown in FIG. 6, the plurality of power-supply terminals Tp and the plurality of ground terminals Tg are arranged side by side along the longitudinal direction of the drive device 41 in a region between the plurality of device control terminals Tc and the plurality of drive terminals Td in the drive device 41. Specifically, the power-supply terminals Tp and the ground terminals Tg are respectively arranged adjacent to the plurality of drive terminals Td described above in the mounting target region Am in the drive device 41. It should be noted that in the present embodiment, since the drive device 41 is mounted on the board surface using the flip-chip mounting, some of the power-supply terminals Tp and the ground terminals Tg are also arranged in an internal region in the drive device 41.

Further, as shown in FIG. 7 and FIG. 8, the constant-potential wiring line Wv (the power-supply wiring line Wp or the ground wiring line Wg) extends along an arrangement positions (in the longitudinal direction; the X-axis direction) of the plurality of constant-potential terminals Tv (the power-supply terminals Tp or the ground terminals Tg) in the drive device 41. It is arranged that the power-supply potential Vp and the ground potential Vg are individually supplied to the drive devices 41 from the power-supply wiring line Wp and the ground wiring line Wg via the power-supply terminals Tp and the ground terminals Tg.

The digital ground terminals Tdg are arranged at a plurality of places different from each other in the mounting target region Am of the drive device 41. Specifically, in the example shown in FIG. 6 through FIG. 8, the plurality of digital ground terminals Tdg is arranged at six places in the mounting target region Am in a distributed manner (so as to be scattered). In particular, the plurality of (two or three) digital ground terminals Tdg are arranged at each of a position between the two drive terminal groups in the plurality of drive terminals Td described above, a position between the two device control terminal groups in the plurality of device control terminals Tc described above, a position between one of the device control terminal groups and the data input terminals Tin, a position between the other of the device control terminal groups and the data output terminals Tout, and a positions at the both ends along the longitudinal direction (the X-axis direction) of the digital circuit arrangement region 410.

Further, as shown in, for example, FIG. 7 and FIG. 8, in the flexible board 13 according to the present embodiment, the digital ground wiring line Wd is electrically coupled commonly to the digital ground terminals Tdg at two or more places out of the digital ground terminals Tdg located at the plurality of places. Specifically, in the example shown in FIG. 7 and FIG. 8, the digital ground terminals Tdg at the two places located at an upper left side in the drawing in the drive device 41 are electrically coupled commonly to each other via the digital ground wiring line Wdg1 having an inverted L shape. Further, the digital ground terminals Tdg at the two places located at an upper right side in the drawing in the drive device 41 are electrically coupled commonly to each other via the digital ground wiring line Wdg3 having an L shape. It should be noted that in the example shown in FIG. 7 and FIG. 8, the digital ground terminals Tdg at a single place located between the two device control terminal groups in the plurality of device control terminals Tc are electrically coupled to the digital ground wiring line Wdg2, and at the same time, the digital ground terminals Tdg located between the two device control terminal groups in the plurality of device control terminals Tc fail to electrically be coupled to the digital ground wiring line Wdg.

Further, in the example of the flexible board 13 shown in FIG. 7, one end side in the digital ground wiring line Wdg1 described above is electrically coupled to a digital ground region DGa outside the drive device 41 via a number of through holes TH. In contrast, the other end side in the digital ground wiring line Wdg1 is electrically coupled to a digital ground region DGb outside the drive device 41 via just one through hole TH. In other words, the one end side in the digital ground wiring line Wdg1 is electrically coupled to the digital ground region DGa which is stable on the one hand, but the other end side in the digital ground wiring line Wdg1 is electrically coupled to the digital ground region DGb which is unstable on the other hand. Thus, it becomes possible to realize the configuration of arranging the stable ground region at the other side of the digital ground wiring line Wdg1 even when the stable ground region cannot be arranged at the one side thereof.

Incidentally, in the example of the flexible board 13 shown in FIG. 8, one side in the digital ground wiring line Wdg1 described above is electrically coupled alone to a digital ground region DGc outside the drive device 41 via a number of through holes TH. In other words, the other side in the digital ground wiring line Wdg1 is not electrically coupled to a digital ground region outside the drive device 41. Also in this case, it results in that the stable ground region is arranged at the one side of the digital ground wiring line Wdg1.

(Differential Lines Lt)

The differential lines Lt (the differential lines Lt1, Lt2, and Lt31 through Lt34) are each arranged at the obverse surface S1 side (in the first wiring layer described above) in the flexible boards 13 as shown in FIG. 6 through FIG. 8. As described above, these differential lines Lt are lines for transmitting the transmission data Dt as the differential signals, and are formed using, for example, LVDS (Low Voltage Differential Signaling). It should be noted that it is possible for each of the differential lines Lt to be formed using, for example, CML (Current Mode Logic) or ECL (Emitter Coupled Logic). Further, these differential lines Lt are each formed using, for example, a so-called microstrip line or a coplanar line.

It should be noted that it is possible to arrange that a variety of components (e.g., a capacitance for AC coupling which becomes necessary when the common voltage is different between an output side device and an input side device), through holes, and so on are arranged on such differential lines Lt. Further, when it is arranged to arrange the through holes, it is possible to arrange to arrange the through holes in the vicinity of the variety of types of power-supply wiring lines Wp and the ground wiring lines Wg in order to perform the impedance control on the through holes.

[Operations and Functions/Advantages]

(A. Basic Operation of Printer 5)

In the printer 5, a recording operation (a printing operation) of images, characters, and so on to the recording target medium (the recording paper P or the like) is performed using such a jet operation of the ink 9 by the inkjet head 1 as described below. Specifically, in the inkjet head 1 according to the present embodiment, the jet operation of the ink 9 using a shear mode is performed in the following manner.

First, the drive devices 41 on each of the flexible boards 13*a*, 13*b*, 13*c*, and 13*d* each apply the drive voltages Vd (the drive signals Sd) to the drive electrodes (the common electrodes and the active electrodes) described above in the actuator plate 111 in the jet section 11. Specifically, each of the drive devices 41 applies the drive voltage Vd to the drive electrodes disposed on the pair of drive walls partitioning the ejection channel described above. Thus, the pair of drive walls each deform so as to protrude toward the dummy channel adjacent to the ejection channel.

On this occasion, it results in that the drive wall makes a flexion deformation to have a V shape centering on the intermediate position in the depth direction in the drive wall. Further, due to such a flexion deformation of the drive wall, the ejection channel deforms as if the ejection channel bulges. As described above, due to the flexion deformation caused by a piezoelectric thickness-shear effect in the pair of drive walls, the volume of the ejection channel increases. Further, by the volume of the ejection channel increasing, the ink 9 is induced into the ejection channel as a result.

Subsequently, the ink 9 induced into the ejection channel in such a manner turns to a pressure wave to propagate to the inside of the ejection channel. Then, the drive voltage Vd to be applied to the drive electrodes becomes 0 (zero) V at the timing at which the pressure wave has reached the nozzle hole Hn of the nozzle plate 112 (or timing around that timing). Thus, the drive walls are restored from the state of the flexion deformation described above, and as a result, the volume of the ejection channel having once increased is restored again.

In such a manner, the pressure inside the ejection channel increases in the process that the volume of the ejection channel is restored, and thus, the ink 9 in the ejection channel is pressurized. As a result, the ink 9 shaped like a droplet is ejected (see FIG. 1) toward the outside (toward the recording paper P) through the nozzle hole Hn. The jet operation (the ejection operation) of the ink 9 in the inkjet head 1 is performed in such a manner, and as a result, the recording operation of images, characters, and so on to the recording paper P is performed.

(B. Functions/Advantages in Inkjet Head 1)

Then, functions and advantages in the inkjet head 1 according to the present embodiment will be described in detail in comparison with a comparative example and so on.

First, in a drive board used in a general inkjet head in the related art, due to a demand of the faster printing speed, it is required to speed up a digital circuit inside the drive device. However, in the high-speed digital circuit, since it is necessary to lower the operating voltage, a problem of an erroneous operation due to a noise is apt to occur. In particular in the inkjet head, since a voltage higher than in a general digital circuit is often handled when driving an actuator, wiring for preventing the digital circuit from the noise caused by driving the actuator has been important.

Further, since the control terminals necessary when performing the operation setting of the drive device itself and so on have been increased due to a progression of multi-function in an inkjet head in recent years, it has become difficult to arrange an appropriate digital ground to digital circuits inside the drive device. Specifically, although the ground to be coupled to the drive device is located, for example, only at the both ends of the drive board, taking the speeding-up of the operating speed in the digital circuit inside the drive device into consideration, it can be said that it is desirable to reinforce the digital ground of the drive device.

(B-1. Comparative Example)

Figure 9:
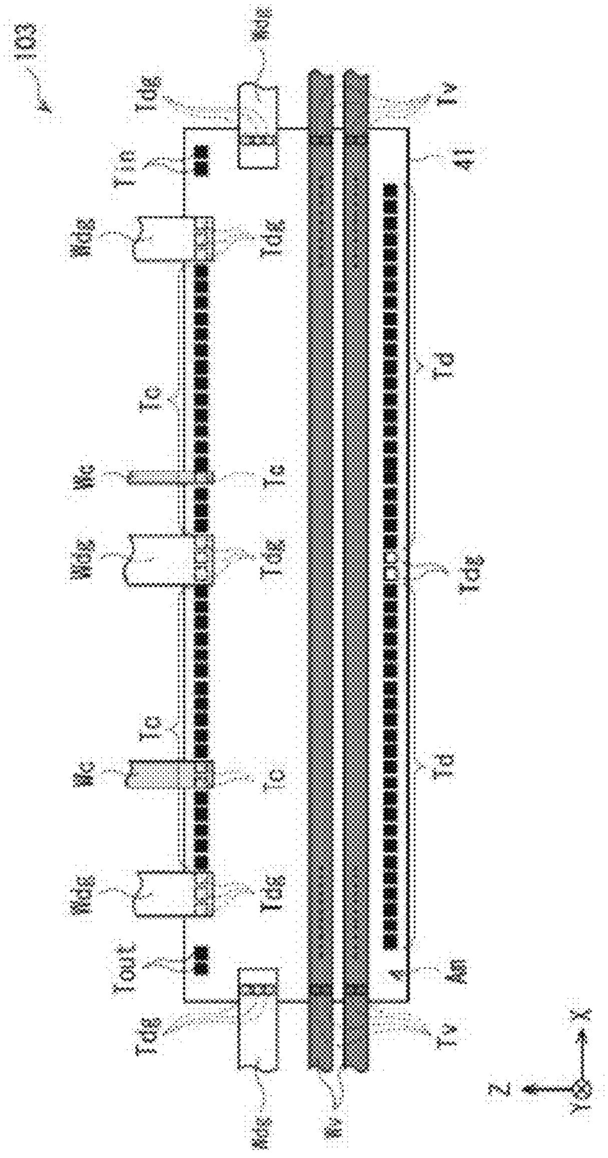
FIG. 9 is a plan view schematically showing a configuration example of a flexible board according to a comparative example.

Here, FIG. 9 is a plan view (a Z-X plane view) schematically showing a configuration example of a drive board (a flexible board 103) according to a comparative example (a configuration example when viewed from the reverse surface S2 side).

In the flexible board 103 according to the comparative example, unlike the flexible boards 13 (FIG. 7 and FIG. 8) according to the present embodiment described above, the digital ground wiring lines Wdg are arranged in the following manner. That is, in the flexible board 103 according to the comparative example, the digital ground wiring lines Wdg are electrically coupled respectively to the plurality of digital ground terminals Tdg located at a plurality of places different from each other in the drive device 41. Specifically, as shown in FIG. 9, in this flexible board 103, the digital ground wiring lines Wdg are electrically coupled individually to the digital ground terminals Tdg at a plurality of places (five places in this example), respectively.

Here, when the digital ground terminals Tdg are scattered at respective places of the drive device 41, a stable operation of the digital circuit inside the drive device 41 has an advantage. However, when the number of the device control terminals Tc and so on has increased, it becomes difficult to achieve the electrical coupling between the digital ground terminals Tdg which are scattered and device control terminals Tc. Specifically, on the board surface on which the drive device is mounted, there is created the state in which the device control wiring lines We to be coupled respectively to the device control terminals Tc become extremely large in number, and at the same time, those device control wiring lines We are closely spaced. Therefore, an arrangement of the digital ground wiring lines Wdg to electrically be coupled to the digital ground terminals Tdg and the power-supply wiring lines becomes difficult, and becomes poor. This leads to the erroneous operation due to the noise of the digital circuit described above.

Due to these circumstances, in the flexible board 103 according to the comparative example, it is difficult to supply the stable digital ground to the drive device 41, and to achieve an increase in efficiency of the wiring arrangement on the board surface of the flexible board 103. As a result, it can be said that in this comparative example, it becomes difficult to achieve stabilization of the operations of the drive device 41, and there is a possibility of incurring the degradation of the reliability.

(B-2. Functions/Advantages)

In contrast, in the inkjet head 1 according to the present embodiment, since the following configuration is adopted, it is possible to obtain, for example, the following functions and advantages.

That is, first, in this inkjet head 1, the digital ground wiring lines Wdg (Wdg1, Wdg3) are electrically coupled commonly to the digital ground terminals Tdg at two or more places out of the digital ground terminals Tdg located at the plurality of places different from each other in the drive device 41.

Thus, unlike the case of the comparative example described above, the necessity of arranging the stable digital ground region to each of the digital ground terminals Tdg at the plurality of places when introducing the digital ground wiring lines Wdg from the outside of the drive device 41 becomes low. In other words, it becomes sufficient to arrange such stable digital ground regions (e.g., the digital ground regions DGa, DGc described above) to the digital ground terminals Tdg in at least one place out of the digital ground terminals Tdg at two or more places electrically coupled to the digital ground wiring line Wdg. Therefore, it is possible to achieve the increase in efficiency of the wiring arrangement on the board surface of the flexible board 13 while supplying the stable digital ground to the drive device 41. As a result, it is possible to achieve the stabilization of the operation of the drive device 41, and thus, it becomes possible to improve the reliability.

2. Modified Examples

Then, some modified examples (Modified Examples 1-1 through 1-3, 2-1, and 2-2) of the embodiment described above will be described. It should be noted that hereinafter, the same constituents as those in the embodiment are denoted by the same reference symbols, and the description thereof will arbitrarily be omitted.

Modified Examples 1-1 Through 1-3

(Configuration)

Figure 10:
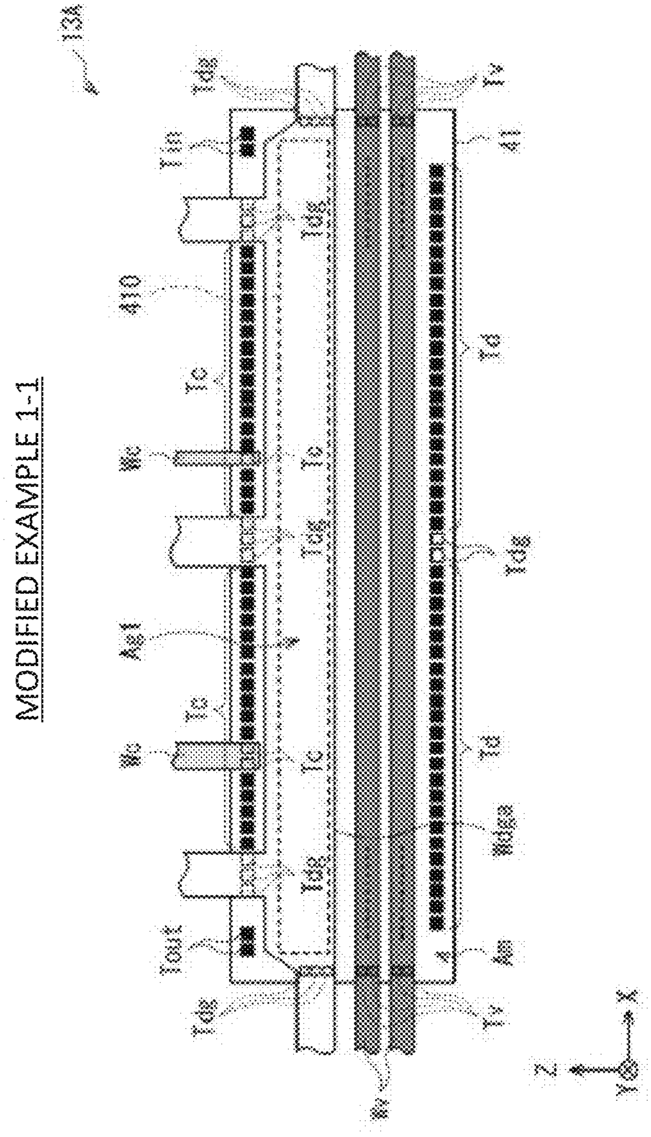
FIG. 10 is a plan view schematically showing a detailed configuration example of a flexible board according to Modified Example 1-1.
Figure 11:
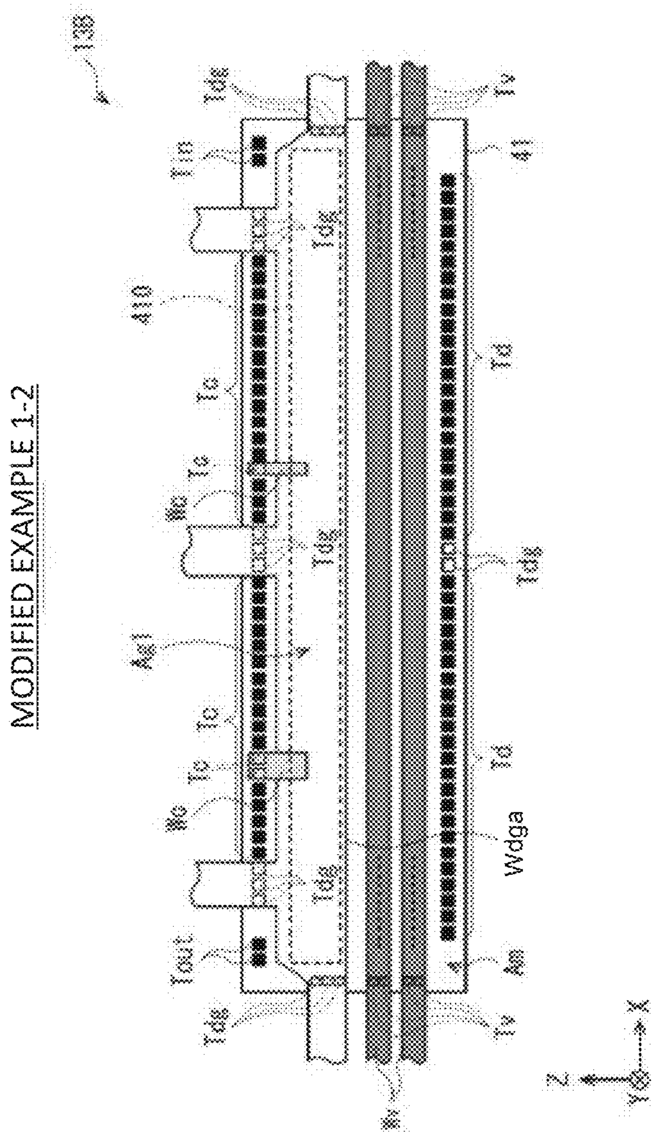
FIG. 11 is a plan view schematically showing a detailed configuration example of a flexible board according to Modified Example 1-2.
Figure 12:
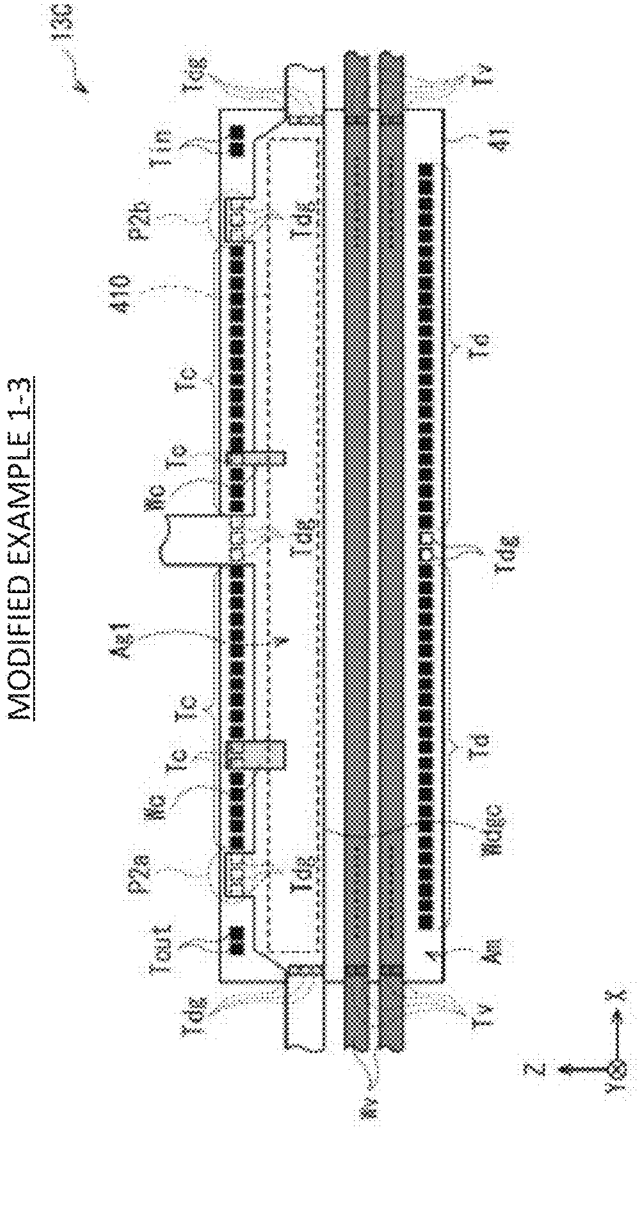
FIG. 12 is a plan view schematically showing a detailed configuration example of a flexible board according to Modified Example 1-3.

FIG. 10 through FIG. 12 are plan views (Z-X plane views) schematically showing detailed configuration examples of flexible boards 13A, 13B, and 13C related to Modified Examples 1-1, 1-2, and 1-3, respectively (configuration examples when viewed from the reverse surface S2 side).

Here, the flexible boards 13A, 13B, and 13C related to such Modified Examples 1-1, 1-2, and 1-3 as described above each correspond to a specific example of the "drive board" in the present disclosure.

As shown in FIG. 10 through FIG. 12, the flexible boards 13A through 13C according to Modified Examples 1-1 through 1-3 each correspond to what is obtained by disposing a digital ground wiring line Wdga, Wdgc instead of the digital ground wiring line Wdg in the flexible board 13 (see FIG. 7 and FIG. 8) according to the embodiment, and are made basically the same in the rest of the configuration.

Specifically, as shown in FIG. 10 and FIG. 11, in the flexible boards 13A, 13B according to Modified Examples 1-1, 1-2, there is disposed the digital ground wiring line Wdga instead of the digital ground wiring line Wdg. Further, as shown in FIG. 12, in the flexible board 13C according to Modified Example 1-3, there is disposed the digital ground wiring line Wdgc instead of the digital ground wiring line Wdg.

These digital ground wiring lines Wdga, Wdgc are each electrically coupled commonly to the digital ground terminals Tdg at the respective places in the drive device 41, and at the same time, each have such a first guard region Ag1 as described below. This first guard region Ag1 is formed so as to overlap at least a part of the digital circuit arrangement region 410 (a region where a variety of digital circuits are arranged) in the drive device 41. Specifically, in the examples shown in FIG. 10 through FIG. 12, the first guard region Ag1 overlaps the entire area of the digital circuit arrangement region 410.

Further, in the flexible board 13A, neither of the plurality of device control wiring lines We is electrically coupled to the digital ground wiring line Wdga (see FIG. 10). In contrast, in each of the flexible boards 13B, 13C, at least one (all of the device control wiring lines We in these examples) of the plurality of device control wiring lines We is electrically coupled to the digital ground wiring line Wdga, Wdgc inside the first guard region Ag1 (see FIG. 11 and FIG. 12).

Further, in the digital ground wiring line Wdga in each of the flexible boards 13A, 13B, wiring lines are extracted from respective coupling places to the digital ground terminals Tdg at the five places toward the outside (the digital ground region) of the drive device 41 (see FIG. 10 and FIG. 11). In contrast, in the digital ground wiring line Wdgc in the flexible board 13C, wiring lines are not extracted toward the outside (the digital ground region) of the drive device 41 regarding some of the coupling places to the digital ground terminals Tdg at the five places (see FIG. 12). Specifically, the wiring lines are extracted toward the outside of the drive device 41 from the coupling places to the digital ground terminals Tdg at three places on the one hand, the wiring lines are not extracted toward the outside of the drive device 41 from the other two places (the places denoted by the reference symbols P2*a*, P2*b* in FIG. 12).

(Functions/Advantages)

In this way, in the flexible boards 13A through 13C according to Modified Examples 1-1 through 1-3, the first guard region Ag1 described above is disposed in the digital ground wiring line Wdga, Wdgc, and therefore, the following is achieved. That is, for example, the noise from a variety of power-supply wiring lines arranged in the vicinity of the drive device 41 is prevented by the first guard region Ag1 from mixing in the digital circuits in the digital circuit arrangement region 410 in the drive device 41. Thus, it is possible to achieve a further stabilization of the operation of the drive device 41, and thus, it becomes possible to further improve the reliability.

Further, in particular in Modified Examples 1-2, 1-3, since at least one of the plurality of device control wiring lines We is electrically coupled to the digital ground wiring line Wdga, Wdgc in the first guard region Ag1, the following is achieved. That is, it is possible to efficiently perform the setting to the ground potential with respect to the device control terminals Tc using the first guard region Ag1. Thus, it becomes easy to ensure an arrangement space for the wiring lines for coupling other power supplies and signal lines on the periphery of the device control terminals Tc. As a result, it becomes possible to achieve a reduction in size of the flexible boards 13B, 13C, and thus, it becomes also possible to achieve a reduction in size of the inkjet head.

Modified Examples 2-1, 2-2

(Configuration)

Figure 13:
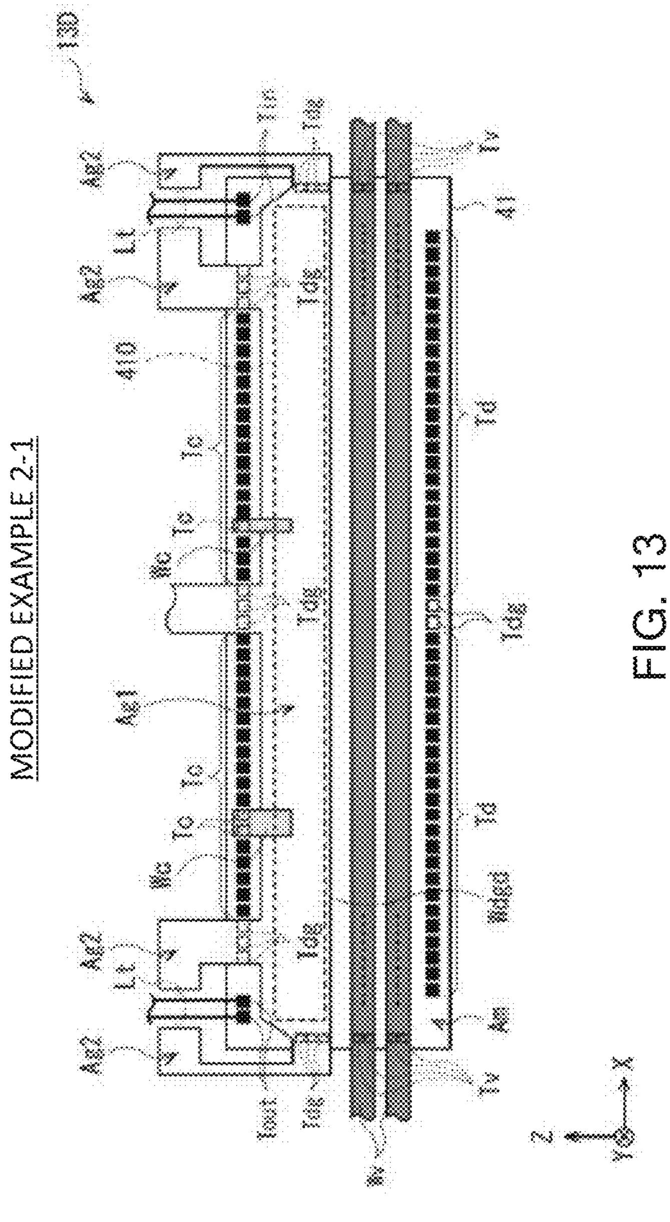
FIG. 13 is a plan view schematically showing a detailed configuration example of a flexible board according to Modified Example 2-1.
Figure 14:
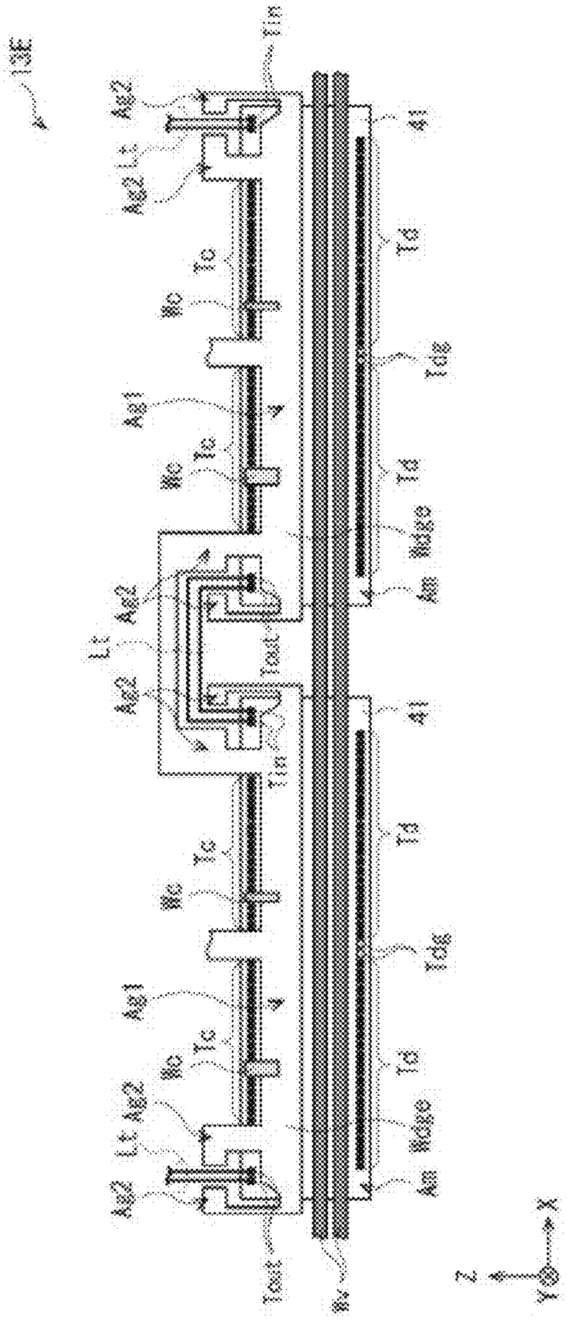
FIG. 14 is a plan view schematically showing a detailed configuration example of a flexible board according to Modified Example 2-2.

FIG. 13 and FIG. 14 are plan views (Z-X plane views) schematically showing detailed configuration examples of flexible boards 13D, 13E according to Modified Examples 2-1, 2-2, respectively (configuration examples when viewed from the reverse surface S2 side). Specifically, in the flexible board 13D according to Modified Example 2-1 shown in FIG. 13, there is shown a planar configuration example of the periphery of one of the drive devices 41, and in the flexible board 13E according to Modified Example 2-2 shown in FIG. 14, there is shown a planar configuration example of the periphery of a plurality of (two) drive devices 41.

Here, the flexible boards 13D, 13E according to such Modified Examples 2-1, 2-2 as described above each correspond to a specific example of the "drive board" in the present disclosure.

As shown in FIG. 13 and FIG. 14, the flexible boards 13D, 13E according to Modified Examples 2-1, 2-2 each correspond to what is obtained by disposing a digital ground wiring line Wdgd, Wdge instead of the digital ground wiring line Wdga, Wdgc in the flexible boards 13A through 13C (see FIG. 10 through FIG. 12) according to Modified Examples 1-1 through 1-3, and are made basically the same in the rest of the configuration.

Specifically, as shown in FIG. 13, in the flexible board 13D according to Modified Example 2-1, there is disposed the digital ground wiring line Wdgd instead of the digital ground wiring line Wdga, Wdgc. Further, as shown in FIG. 14, in the flexible board 13E according to Modified Example 2-2, there is disposed the digital ground wiring line Wdge instead of the digital ground wiring line Wdga, Wdgc.

In each of these flexible boards 13D, 13E, the differential lines Lt (the differential-transmission wiring lines) as the data wiring lines are electrically coupled individually to the data input terminals Tin and the data output terminals Tout in the drive device 41. Further, in particular in the flexible board 13E, the plurality of drive devices 41 is cascaded to each other via the differential lines Lt (see FIG. 14). In other words, the data output terminals Tout in one of the drive devices 41 and the data input terminals Tin in the other of the drive devices 41 are coupled to each other via the differential lines Lt.

Further, each of the digital ground wiring lines Wdgd, Wdge described above has a second guard region Ag2 which is arranged on the periphery of such differential lines Lt, and which is electrically coupled to the first guard region Ag1 (see FIG. 13 and FIG. 14). In other words, these digital ground wiring lines Wdgd, Wdge correspond what is obtained by further disposing such a second guard region Ag2 in the digital ground wiring lines Wdga, Wdgc, respectively.

In the examples shown in FIG. 13 and FIG. 14, the second guard region Ag2 is made to have an L shape of surrounding the differential lines Lt, the data input terminals Tin, and the data output terminals Tout from both sides along the X-axis direction in the vicinity of each of the data input terminals Tin and the data output terminals Tout. Further, in particular in the example of the digital ground wiring line Wdge shown in FIG. 14, the single digital ground wiring line Wdge is commonly arranged to the plurality of drive devices 41 adjacent to each other. Further, the second guard region Ag2 extends along the differential lines Lt between these drive devices 41. In other words, the first guard region Ag1 corresponding to one of the drive devices 41 and the first guard region Ag1 corresponding to the other of the drive devices 41 are coupled to each other via the second guard region Ag2 (see FIG. 14).

(Functions/Advantages)

In this way, in the flexible boards 13D, 13E according to Modified Examples 2-1, 2-2, the second guard region Ag2 electrically coupled to the first guard region Ag1 is disposed on the periphery of the data wiring lines (the differential lines Lt) described above in the digital ground wiring line Wdgd, Wdge, and therefore, the following is achieved. That is, it becomes possible to arrange the guard region to the data wiring lines without using, for example, other digital grounds and so on arranged outside the drive device 41. Thus, since it is possible to achieve a further increase in efficiency of the wiring arrangement on the board surface of the flexible boards 13D, 13E, it becomes possible to achieve a reduction in size of the flexible boards 13D, 13E, and thus, it becomes also possible to achieve the reduction in size of the inkjet head.

Further, in Modified Examples 2-1, 2-2 described above, since the differential lines Lt (the differential-transmission wiring lines) are included as the data wiring lines described above, it becomes possible to perform impedance control using the second guard region Ag2 in the digital ground wiring lines Wdgd, Wdge. Thus, the degree of freedom of the impedance control rises, and therefore, it becomes possible to achieve a further reduction in size of the flexible boards 13D, 13E and the inkjet head.

Further, in particular in Modified Example 2-2, since the plurality of drive devices 41 is cascaded to each other via the differential lines Lt, the following is achieved. That is, even when the plurality of drive devices 41 is mounted on the board surface of the flexible board 13E, it is possible to achieve an increase in efficiency of the wiring arrangement on the board surface while supplying the stable digital ground to each of the drive devices 41. Thus, it is possible to achieve the stabilization of the operation of each of the drive devices 41, and thus, it becomes possible to improve the reliability.

3. Other Modified Examples

The present disclosure is hereinabove described citing the embodiment and some modified examples, but the present disclosure is not limited to the embodiment and so on, and a variety of modifications can be adopted.

For example, in the embodiment and so on described above, the description is presented specifically citing the configuration examples (the shapes, the arrangements, the number and so on) of each of the members in the printer and the inkjet head, but those described in the above embodiment and so on are not limitations, and it is possible to adopt other shapes, arrangements, numbers and so on.

Specifically, for example, in the embodiment and so on described above, the description is presented specifically citing the configuration examples (the shapes, the arrangements, the number, and so on) of the flexible boards (the drive boards), the drive devices, the differential lines, a variety of terminals, a variety of wiring lines, and so on, but these configuration examples are not limited to those described in the above embodiment and so on. For example, in the embodiment and so on described above, the description is presented citing when the "drive board" in the present disclosure is the flexible board as an example, but the "drive board" in the present disclosure can also be, for example, an inflexible board. Further, in the embodiment and so on described above, there is described the example when the plurality of drive boards is disposed inside the inkjet head, but this example is not a limitation, and it is possible to arrange that, for example, just one drive board is disposed alone inside the inkjet head. Further, in the embodiment and so on described above, there is described the example when the plurality of drive devices is arranged in series to each other with the cascade connection between the data output terminal Tout and the data input terminal Tin in each of the drive boards, but this example is not a limitation. Specifically, it is possible to arrange that, for example, the plurality of drive devices is connected in parallel to each other (instead of the cascade connection described above), or a single drive device is disposed alone in each of the drive boards. Further, in the embodiment and so on described above, the shape of the drive device is assumed to be the rectangular shape, but this example is not a limitation, and the shape of the drive device can be, for example, a square shape. In addition, in the embodiment and so on described above, the plurality of drive devices is arranged side by side along the longitudinal direction thereof, but this example is not a limitation, and it is possible to arrange that, for example, the plurality of drive devices is not arranged side by side along the longitudinal direction thereof. Further, in the embodiment and so on described above, there is described the example when the drive devices are mounted on the board surface in each of the drive boards using the flip-chip mounting, but this example is not a limitation, and it is possible to arrange that, for example, the drive devices are mounted on the board surface using other mounting methods (insertion mounting with solder, surface mounting, wire bonding mounting, and so on). Further, in the embodiment and so on described above, there is presented the description citing when the data wiring lines for transmitting the transmission data Dt are the differential-transmission wiring lines (the differential lines Lt) as an example, but this case is not a limitation, and for example, the data wiring lines can be a wiring line for single-ended transmission. In addition, in the embodiment and so on described above, there is mainly described the application example related to the digital circuit and the digital ground, but it is possible to apply the present disclosure with respect to, for example, an analog circuit and analog ground (ground with respect to analog signals) in some cases.

Further, the numerical examples of the variety of parameters described in the embodiment and so on described above are not limited to the numerical examples described in the embodiment and so on, and can also be other numerical values.

Further, a variety of types of structures can be adopted as the structure of the inkjet head. Specifically, it is possible to adopt, for example, a so-called side-shoot type inkjet head which ejects the ink 9 from a central portion in the extending direction of each of the ejection channels in the actuator plate 111. Alternatively, it is possible to adopt, for example, a so-called edge-shoot type inkjet head for ejecting the ink 9 along the extending direction of each of the ejection channels. Further, the type of the printer is not limited to the type described in the embodiment and so on described above, and it is possible to apply a variety of types such as an MEMS (Micro Electro-Mechanical Systems) type.

Further, for example, it is possible to apply the present disclosure to either of an inkjet head of a circulation type which uses the ink 9 while circulating the ink 9 between the ink tank and the inkjet head, and an inkjet head of a non-circulation type which uses the ink 9 without circulating the ink 9.

Further, the series of processing described in the above embodiment and so on can be arranged to be performed by hardware (a circuit), or can also be arranged to be performed by software (a program). When arranging that the series of processing is performed by the software, the software is constituted by a program group for making the computer perform the functions. The programs can be incorporated in advance in the computer described above to be used by the computer, for example, or can also be installed in the computer described above from a network or a recording medium to be used by the computer.

Further, in the embodiment and so on described above, the description is presented citing the printer 5 (the inkjet printer) as a specific example of the "liquid jet recording device" in the present disclosure, but this example is not a limitation, and it is also possible to apply the present disclosure to other devices than the inkjet printer. In other words, it is also possible to arrange that the "liquid jet head" (the inkjet head) of the present disclosure is applied to other devices than the inkjet printer. Specifically, it is also possible to arrange that the "liquid jet head" of the present disclosure is applied to a device such as a facsimile or an on-demand printer.

In addition, it is also possible to apply the variety of examples described hereinabove in arbitrary combination.

It should be noted that the advantages described in the present specification are illustrative only, but are not a limitation, and other advantages can also be provided.

Further, the present disclosure can also take the following configurations.

<1> A drive board configured to output a drive signal to be applied to a liquid jet head having a plurality of nozzles, the drive board comprising at least one drive device which is mounted on a board surface of the drive board, which is configured to generate the drive signal for jetting liquid from the nozzles, and which has a plurality of digital ground terminals located at a plurality of places different from each other; and a digital ground wiring line which is arranged in a mounting region of the drive device, and which is electrically coupled commonly to the digital ground terminals at two or more places out of the digital ground terminals at the plurality of places.

<2> The drive board according to <1>, wherein the drive device further has a digital circuit arrangement region in which a digital circuit is arranged in the mounting region, and the digital ground wiring line has a first guard region which is formed so as to overlap at least a part of the digital circuit arrangement region.

<3> The drive board according to <2>, further comprising a plurality of device control wiring lines electrically coupled individually to a plurality of device control terminals further provided to the drive device, wherein at least one of the plurality of device control wiring lines is electrically coupled to the digital ground wiring line in the first guard region.

<4> The drive board according to <2> or <3>, further comprising data wiring lines electrically coupled individually to a data input terminal configured to input data and a data output terminal configured to output the data, the data input terminal and the data output terminal being further provided to the drive device, wherein the digital ground wiring line further has a second guard region which is arranged around the data wiring lines, and which is electrically coupled to the first guard region.

<5> The drive board according to <4>, wherein the data wiring lines include differential-transmission wiring lines.

<6> The drive board according to <5>, wherein a plurality of the drive devices is cascaded to each other via the differential-transmission wiring lines.

<7> A liquid jet head comprising the drive board according to any one of <1> to <6>; and a jet section which is configured to jet the liquid based on the drive signal output from the drive board, and which has the plurality of nozzles.

<8> A liquid jet recording device comprising the liquid jet head according to <7>.

What is claimed is:

1. A drive board configured to output a drive signal to be applied to a liquid jet head having a plurality of nozzles, the drive board comprising:

at least one drive device which is mounted on a board surface of the drive board, which is configured to generate the drive signal for jetting liquid from the nozzles, and which has a plurality of digital ground terminals located at a plurality of places different from each other; and a digital ground wiring line which is arranged in a mounting region of the drive device, and which is electrically coupled commonly to the digital ground terminals at two or more places out of the digital ground terminals at the plurality of places, wherein the drive device further has a digital circuit arrangement region in which a digital circuit is arranged in the mounting region, and the digital ground wiring line has a first guard region which is formed so as to overlap at least a part of the digital circuit arrangement region.

2. The drive board according to claim 1, further comprising a plurality of device control wiring lines electrically coupled individually to a plurality of device control terminals further provided to the drive device, wherein at least one of the plurality of device control wiring lines is electrically coupled to the digital ground wiring line in the first guard region.

3. The drive board according to claim 1, further comprising data wiring lines electrically coupled individually to a data input terminal configured to input data and a data output terminal configured to output the data, the data input terminal and the data output terminal being further provided to the drive device, wherein the digital ground wiring line further has a second guard region which is arranged around the data wiring lines, and which is electrically coupled to the first guard region.

4. The drive board according to claim 2, wherein the data wiring lines include differential-transmission wiring lines.

5. The drive board according to claim 3, wherein a plurality of the drive devices is cascaded to each other via the differential-transmission wiring lines.

6. A liquid jet head comprising:

the drive board according to claim 1; and a jet section which is configured to jet the liquid based on the drive signal output from the drive board, and which has the plurality of nozzles.

7. A liquid jet recording device comprising the liquid jet head according to claim 6.

* * * * *